Nov. 5, 1940.                R. SAULNIER                 2,220,546
                          AIRCRAFT TAIL DEVICE
                         Filed Jan. 21, 1938            3 Sheets-Sheet 1
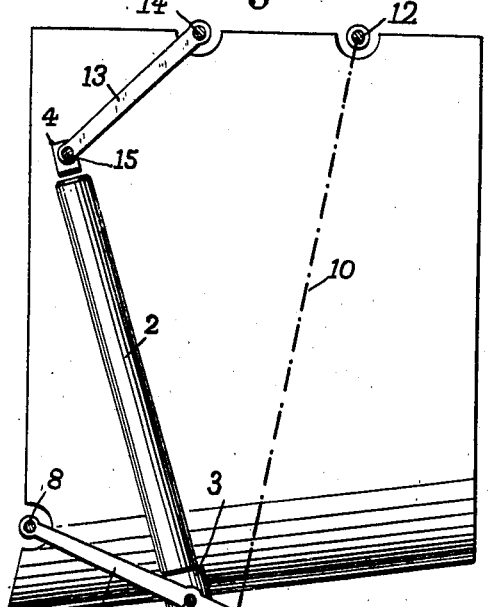
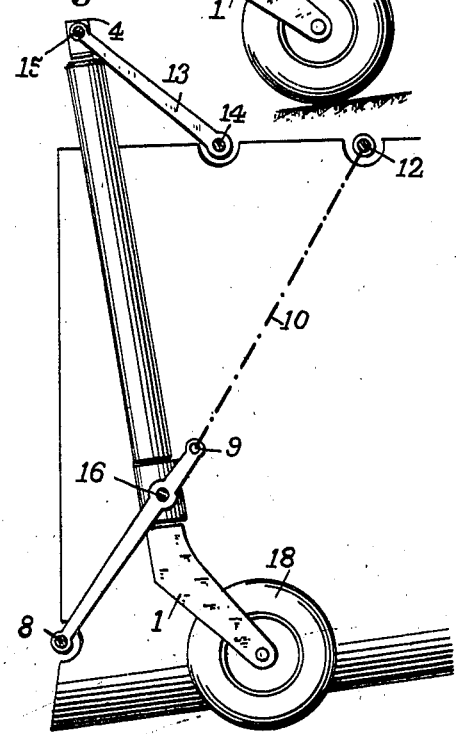
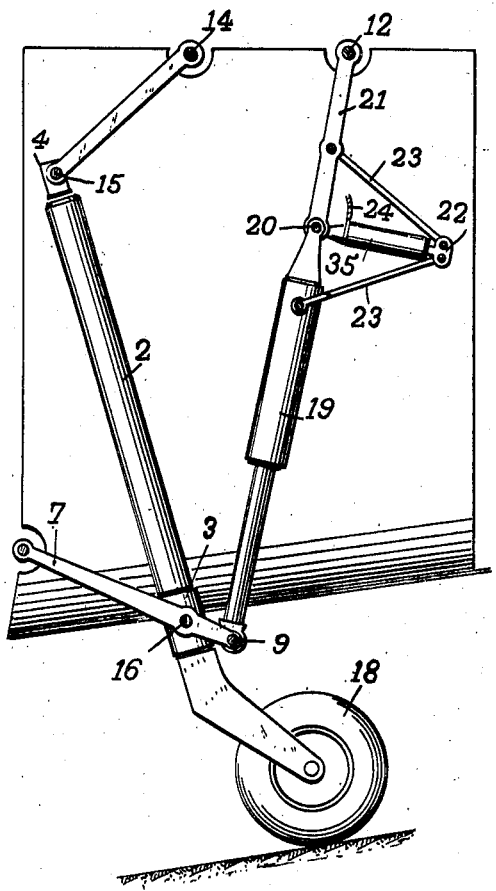
Inventor,
R. Saulnier
by: Glascock Downing & Seebold
Attys.

Nov. 5, 1940.  R. SAULNIER  2,220,546
AIRCRAFT TAIL DEVICE
Filed Jan. 21, 1938  3 Sheets-Sheet 2
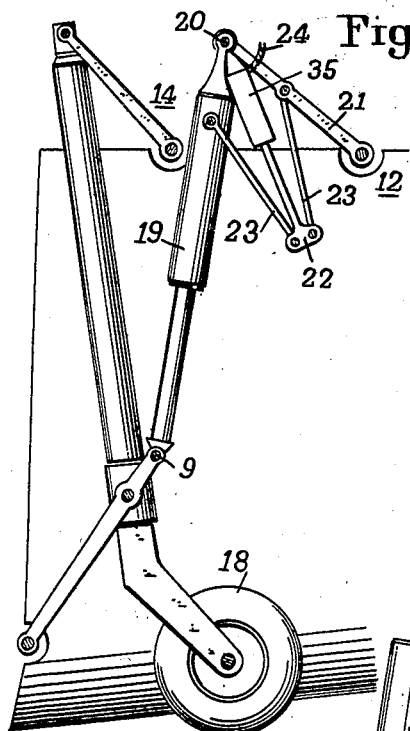
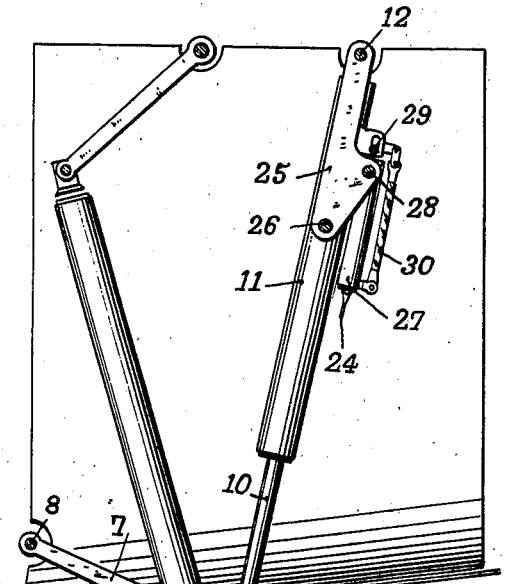
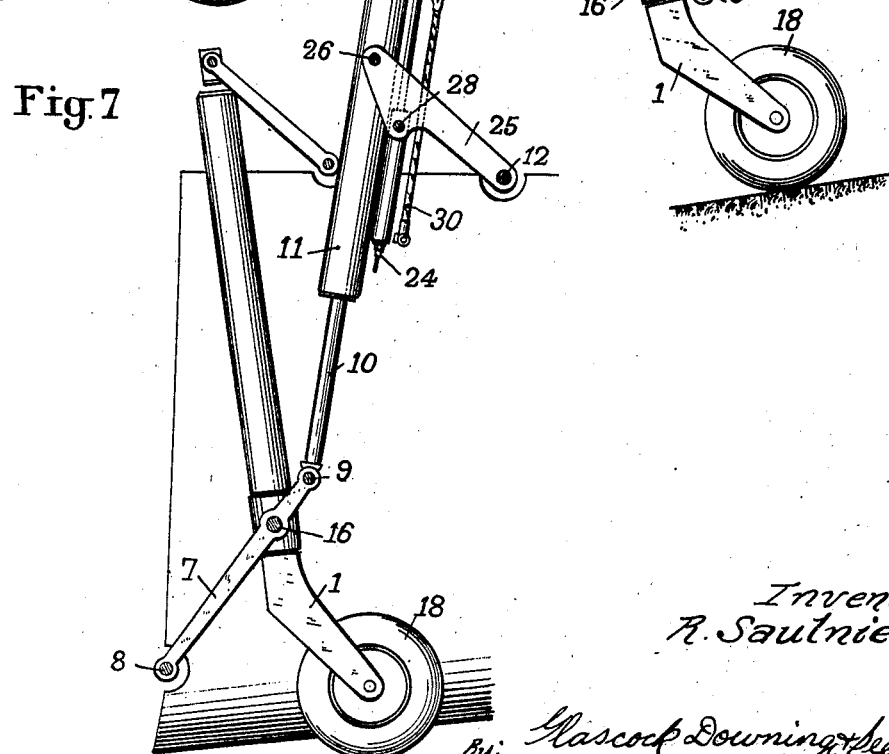
Inventor,
R. Saulnier
By: Glascock Downing & Seebold Nov. 5, 1940.                R. SAULNIER                2,220,546
                          AIRCRAFT TAIL DEVICE
                          Filed Jan. 21, 1938          3 Sheets-Sheet 3

Patented Nov. 5, 1940

2,220,546

UNITED STATES PATENT OFFICE 2,220,546

AIRCRAFT TAIL DEVICE

Raymond Saulnier, Paris, France

Application January 21, 1938, Serial No. 186,198
In Germany January 22, 1937

4 Claims. (Cl. 244—102)

In a prior patent, I described a tail skid for an airplane or similar machine in which the skid or runner was carried by a tube or other cylindrical element mounted in such manner as to be able to turn without being permitted to slide in two collars connected with the body of the airplane each through an independent lever, one of these levers being located on one side of the tube or cylindrical element and the other on the opposite side.

In this device, the displacement of said tube or cylindrical element was braked by a suitable shock absorber connecting a suitable point of one of these levers with a pivot axis mounted in fixed position on the airplane body.

The chief object of the present invention is to provide a device of this kind including means for retracting the tail skid into the tail of the airplane when so desired, for instance in flight.

For this purpose, according to the essential feature of the present invention, the structure, including the shock-absorber, which connects the fixed axis with the point at which said structure is pivotally connected to one of said levers is adapted to vary in length.

Other features of the present invention will be apparent from the following detailed description of some specific embodiments thereof.

Preferred embodiments of the present invention will be hereinafter described, with reference to the accompanying drawings, given merely by way of example, and in which:

Fig. 1 is a diagrammatical side view illustrating the principle of the present invention, the parts being shown in the position which corresponds to the skid projecting from the tail;

Fig. 2 is a view corresponding to Fig. 1, showing the relative position of the parts when the tail skid is retracted;

Fig. 3 is a side view showing a first embodiment of the present invention, with the tail skid projecting from the tail;

Fig. 4 is a view similar to Fig. 3, showing the tail skid retracted;

Fig. 6 is a side view showing another embodiment of the invention, with the tail skid projecting from the tail;

Fig. 7 is a corresponding view, with the tail skid retracted;

Figure 5:
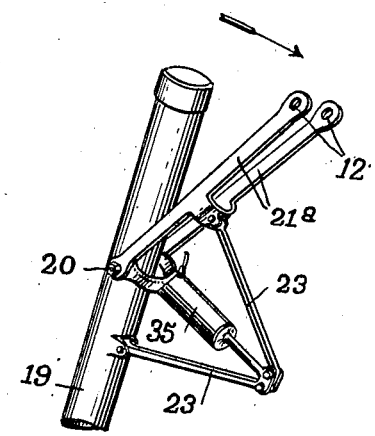
Fig. 5 is a perspective view showing a modification of the arrangement of Figs. 3 and 4.

In Fig. 1, I have diagrammatically shown, by dash-and-dot line 10, the mechanism which connects together points 9 and 12. Point 12 is a fixed point of the airplane structure, while point 9 is at the end of an arm or lever 7 the other end of which is pivoted at 8 to the body of the airplane.

The wheel 18 which constitutes the tail skid is journalled in a fork 1 forming the end of a tube 2 adapted to pivot but not to slide in collars 3 and 4. Collar 3 is carried by a point 16 of lever 7, and collar 4 is pivotally carried by the end 15 of a lever 13 pivoted at 14 to the airplane body and located on the other side of tube 2 from point 8.

Fig. 2 clearly shows that if distance 9—12 is shortened, the skid is retracted inside the tail of the airplane. As a matter of fact, as point 12 is a fixed point of the airplane body, it will be readily understood that, when the length of structure 10 is reduced, point 9 is caused to move upwardly, thus moving tube 2 and the wheel 18 thereof together with it.

Of course, within the scope of the present invention, there are many different manners of providing for a reduction of the distance 9—12.

In the embodiment shown by Figs. 3 and 4, the elastic bar 10 which connects points 9 and 12 with each other is made of two portions 19 and 21, hinged together at a point 20. At this point, I provide a jack 35, arranged at right angles to said elements 19 and 21, when the latter are in line with each other. The end of the rod 22 of this jack is connected through two links 23 with arms 19 and 21, respectively. One of these arms, to wit, 19 includes the shock absorber system, whereas the other, 21, is rigid.

When a fluid under pressure is fed to jack 35 through pipe 24, the rod of the jack is caused to project outwardly (see Fig. 4), which involves the folding of arms 19 and 21. As clearly shown by Fig. 4, all the pivot points and all the parts of the system are arranged in such manner that this expansion of the jack causes the skid to be retracted inside the tail of the airplane.

In a modification, illustrated by Fig. 5, I have shown the case in which it is not possible to reduce the length of shock absorber 19 sufficiently for preventing it from projecting beyond hinge 20. In other words, in this case, the shock absorber must necessarily extend beyond point 20. In this embodiment also, arm 21 is jointed at 20 to arm 19, jack 35 keeping the same position with respect to the hinge and to elements 19 and 21 as in the embodiment of Figs. 3 and 4. However, in order to give the shock absorber the necessary length, arm 21 is given the shape of a fork 21a, externally pivoted at 20 to shock absorber 19 in such manner that the shock absorber passes between the branches of the fork. The operation of this device corresponds exactly to that above described with reference to Figs. 3 and 4.

In the embodiment shown by Figs. 6 and 7, two connecting rods 25 are pivoted at their ends 26 to the body 11 of the shock absorber on either side thereof, whereas the other ends of said connecting rods are pivoted to the airplane body about axis 12. In order to retract wheel 18 inside the tail of the airplane, I make use of a jack 27 the body of which is pivoted at 28 to the connecting rods 25, whereas the rod of this jack bears at 29 on a lug carried by said shock absorber.

If fluid under pressure is fed through pipe 24 into jack 27, the rod of said jack is driven out, as shown by Fig. 7, and it causes connecting rods 25 to pivot about axis 12. This rotation has for its effect to reduce distance 9—12 so that, in this case also, the tail skid is retracted inside the tail of the airplane. Wheel 18 may be urged in a downward direction by means of return springs or of an elastic cable 30 which causes the piston rod of jack 27 to move inwardly in the cylinder thereof when fluid under pressure is no longer fed through pipe 24.

Figure 8:
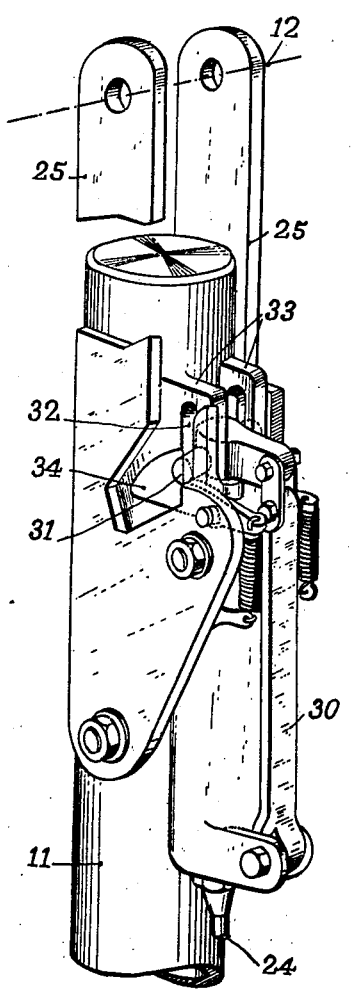
Fig. 8 is a detail perspective view showing means for locking the respective parts of the embodiment of Figs. 6 and 7.

In order to avoid an accidental folding of connecting rods 25 when the airplane is running on the ground, I have provided an automatic locking device which is shown in detail in Fig. 8. In this device, the rod of the jack is provided with a transverse pin 31 guided in two slideways 32 formed in two lugs 33 rigid with the body 11 of the shock absorber. This pin 31 projects on either side of lugs 33 through slideways 32. Opposite this axis or spindle 31, I provide two pawls 34 pivoted to the inner sides of connecting rods 25. The size and position of these pawls are so determined that, when pin 31 is at the top end of slideways 32, said pawls can no longer engage it.

This safety device operates in the following manner:

When the airplane is running on the ground, the rod of the jack is fully driven in the jack and it is kept in this position by elastic cable 30. In this position of the parts, pin 31, engaged by pawls 34, prevents any rotation of connecting rods 25. If fluid under pressure is fed to the inside of the jack through pipe 29, the rod of the jack is pushed outwardly and it moves pin 31 upwardly, until the latter reaches the end of slideways 32. In this position, pin 31 is no longer engaged by pawls 34. The rod of the jack then pushes lugs 33 upwardly through pin 31, which produces a rotation of connecting rods 25 about point 12, so that the tail skid is retracted as above explained.

In the course of the movement in the opposite direction, when the tail skid is being lowered, pin 31 automatically engages pawls 34 so that the connecting rods are locked by said pawls.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. A tail skid device for an airplane body which comprises, in combination, a skid member adapted to run on the ground, a cylindrical element carrying said skid member, two annular supports surrounding said cylindrical element so as to permit its rotation therein while preventing its sliding displacement, two levers pivoted to said airplane body at points thereof located on opposite sides of said cylindrical element, said levers being pivotally connected to said ring-shaped supports, respectively, for supporting them, two parts one pivoted to a fixed point of said airplane body and the other to a point of one of said levers, one of said parts consisting of a rigid bar and the other of a shock absorber, a hinge connecting said two parts together so that said skid member is projecting from the airplane body when said two parts are in line with each other and is retracted inside said airplane body when said two parts make an angle with each other, a jack carried by said hinge so as to extend at right angles to both of said parts when they are in line with each other, said jack including a movable piston, and two connecting rods interposed between said movable piston and intermediate points of said rigid bar and said shock absorber.

2. A tail skid device for an airplane body which comprises, in combination, a skid member adapted to run on the ground, a cylindrical element carrying said skid member, two annular supports surrounding said cylindrical element so as to permit its rotation therein while preventing its sliding displacement, two levers pivoted to said airplane body at points thereof located on opposite sides of said cylindrical element, said levers being pivotally connected to said ring-shaped supports, respectively, for supporting them, two parts pivoted one to a fixed point of said airplane body and the other to a point of one of said levers, one of said parts consisting of a shock absorber and the other of a fork-shaped rigid bar, a hinge connecting an intermediate point of said shock absorber with the end of the branches of said fork-shaped bar, so that said skid member is projecting from the airplane body when said shock absorber and said fork-shaped bar are in line with each other and is retracted inside said airplane body when said two parts make an angle with each other, a jack carried by said hinge so as to extend at right angles to both of said two parts when they are in line with each other, said jack including a movable piston, and two connecting rods interposed between said movable piston and intermediate points of said rigid fork-shaped bar and said shock absorber, respectively.

3. A tail skid device for an airplane body which comprises, in combination, a skid member adapted to run on the ground, a cylindrical element carrying said skid member, two annular supports surrounding said cylindrical element so as to permit its rotation therein while preventing its sliding displacement, two levers pivoted to said airplane body at points thereof located on opposite sides of said cylindrical element, said levers being pivotally connected to said ring-shaped supports, respectively, for supporting them, a shock absorber pivoted at one end to a point of one of said levers, two parallel connecting rods pivoted to an intermediate part of said shock absorber on either side thereof at one end, and both pivoted to a fixed point of said airplane body at the other end, a jack made of two parts slidable in each other, one of said parts being pivotally connected with respective points of said connecting rods which are not on the line joining the pivoting ends thereof, the other part of said jack being connected to a point of the part of said shock absorber which is adapted to come between said connecting rods, and elastic means for urging said two parts of the jack away from each other.

4. A tail skid device for an airplane body which comprises, in combination, a skid member adapted to run on the ground, a cylindrical element carrying said skid member, two annular supports surrounding said cylindrical element so as to permit its rotation therein while preventing its sliding displacement, two levers pivoted to said airplane body at points thereof located on opposite sides of said cylindrical element, respectively, said levers being pivotally connected to said ring-shaped supports, respectively, for supporting them, a shock absorber pivoted at one end to a point of one of said levers, two parallel connecting rods pivoted at one end to an intermediate point of said shock absorber on either side thereof and both pivoted at the other end to a fixed point of said airplane body, a jack made of two parts slidable in each other, one of said parts being pivotally connected to both of said connecting rods at points thereof which are not on the line joining the pivoting ends thereof, two parallel lugs carried by the part of said shock absorber which is to come between said connecting rods, a pin carried by the other part of said jack, slots provided in said lugs for slidably accommodating said pin, elastic means for urging said parts of the jack away from each other, and pawls carried by said connecting rod adapted to engage said pin when the latter is at the inner end of said slot corresponding to the parts of the jack being retracted in each other.

RAYMOND SAULNIER.